United States Patent [19]

Plummer

[11] Patent Number: 4,908,064

[45] Date of Patent: Mar. 13, 1990

[54] ROAD ASPHALT COMPOSITION

[75] Inventor: Mark A. Plummer, Littleton, Colo.

[73] Assignee: Marathon Oil Company, Findlay, Ohio

[21] Appl. No.: 224,979

[22] Filed: Jul. 27, 1988

[51] Int. Cl.$^4$ .............................................. C08L 95/00
[52] U.S. Cl. ............................ 106/281.1; 106/284.3; 106/273.1; 208/22; 208/39; 208/44
[58] Field of Search ............... 106/273.1, 281.1, 284.3; 208/22, 39, 44

[56] References Cited

U.S. PATENT DOCUMENTS

| | | | |
|---|---|---|---|
| 3,261,269 | 7/1966 | McGovern | 94/23 |
| 4,006,075 | 2/1977 | Lukenbach | 208/164 |
| 4,247,335 | 1/1981 | Beckham | 106/273 R |

FOREIGN PATENT DOCUMENTS 38722 7/1976 Japan .

*Primary Examiner*—Paul Lieberman
*Assistant Examiner*—Helene Klemanski
*Attorney, Agent, or Firm*—Jack L. Hummel; Jack E. Ebel

[57] ABSTRACT

Asphalt used for road paving containing catalytic cracking catalyst particles which have been burned to remove hydrocarbons deposited thereon during a petroleum catalytic cracking process. The catalyst particles may be present in the asphalt in amounts of from 0.1% to 5.0% by weight of the asphalt, but more preferably from 0.2% to 2.0% by weight of the asphalt. The particles, which are comprised of crystalline and amorphous silica and alumina and silica-alumina combinations, function to prevent oxidative condensation of the asphalt, thus preventing hardening of the asphalt.

20 Claims, 1 Drawing Sheet

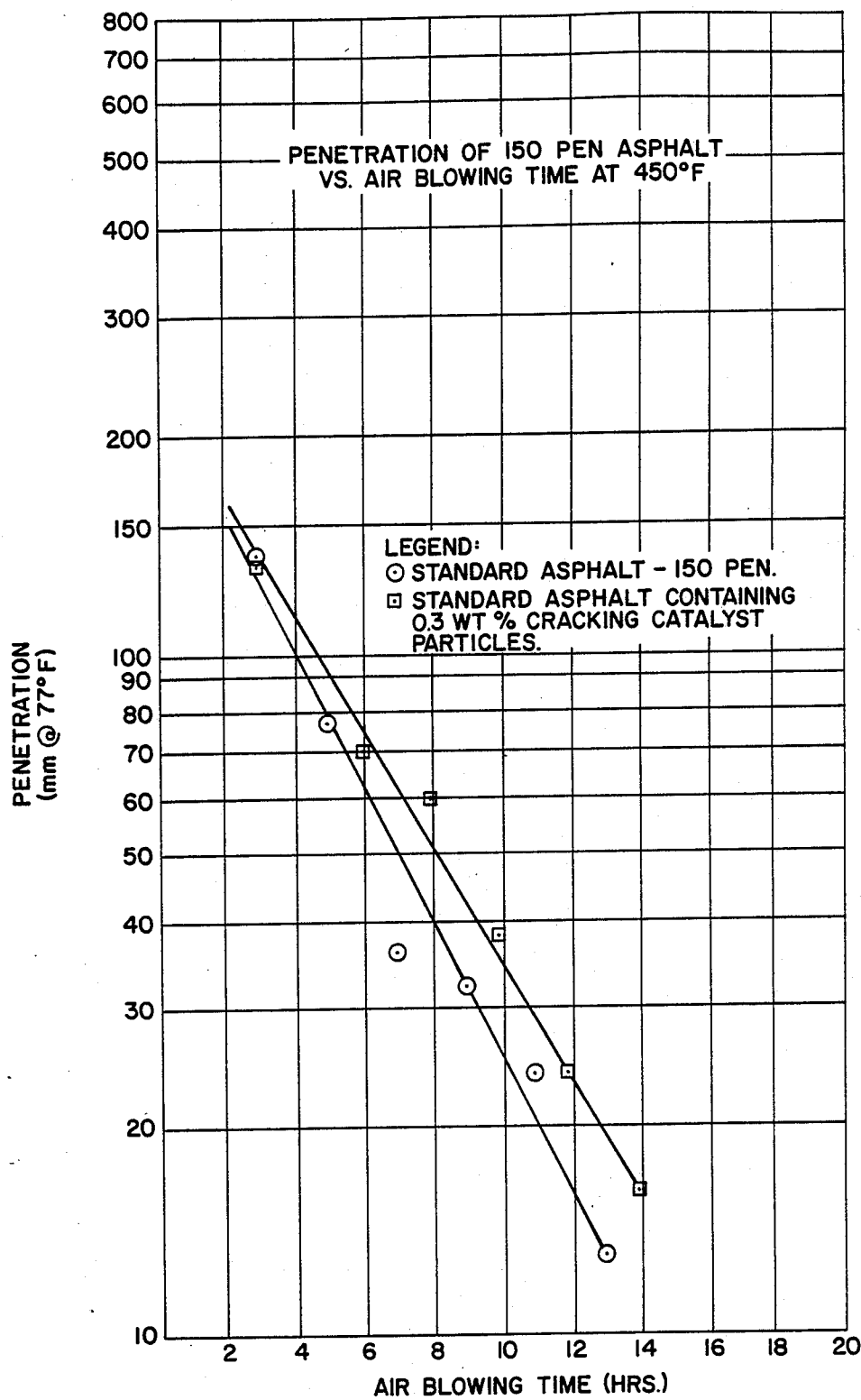

ROAD ASPHALT COMPOSITION

FIELD OF THE INVENTION

This invention relates to asphalts of the type used in road construction. More particularly, it relates to such asphalts which contain an additive for decreasing the hardening of the asphalt with age.

BACKGROUND OF THE INVENTION

Asphalts used in the construction of roads typically harden and become less flexible after the asphaltic paving mixture has been applied. Even though the typical paving mixture contains only a relatively small amount of asphalt, the remainder being comprised of inorganic aggregates and fillers, it is the asphalt that provides the resiliency and elasticity of the paving material necessary for proper performance. Thus the loss of flexibility causes road cracking and deterioration over a period of time. Softer grades of asphalt have been employed in an attempt to prevent cracking, but they reduce the compressive strength of the road and allow rutting to occur.

Much of the hardening comes about as a result of oxidative condensation of the asphalt. Chemical antioxidants have been proposed, but they are not completely satisfactory due to cost and processing requirements. It would be especially advantageous to have available an additive which not only would prevent oxidative condensation reactions from taking place, but would be inexpensive and readily available to the asphalt producer.

SUMMARY OF THE INVENTION

According to the invention, particles of petroleum catalytic cracking catalyst are mixed with road asphalt in amounts, by weight of the asphalt, in the range of 0.1% to 5.0%. This material is a common by-product of the fluid catalytic cracking process and is readily available from refinery operations. In the normal course of catalytic cracking, coke is formed on the catalyst particles. To remove the coke it is burned in air. As the combustion gases move through the stack they are cleaned by a scrubber which scrubs off very fine particles of 1 to 200 microns in size. These particles are still active catalysts, being comprised of crystalline and amorphous silica and alumina and silicaalumina combinations. When such particles are used as an additive in road asphalt they act to prevent oxidative condensation of the asphalt. The commercial use of the particles of catalyst has the added benefit of solving the problem of disposal. Normally, such material would have to be disposed of in land fills.

The preferred amounts of catalyst to be incorporated in the asphalt will vary within the specified range with the character of the asphalt. Within the range of 0.1 to 5.0 wt % of catalyst, however, a narrower range of 0.2 to 2.0 wt % will often be preferred. The use of the catalyst additive of the invention does not change the normal ratio of asphalt to aggregates and fillers in the paving mix, which continues to be about 3% to 8% asphalt and 92% to 97% inorganic aggregate and filler, both amounts being by weight of the paving mix.

This invention will readily be distinguished from Japanese Patent No. 38722 which discloses the use of cracking catalyst in asphalt in order to improve the strength of the asphalt. The catalyst particles, with hydrocarbon compounds still adsorbed on the surface, are added to the aggregate and fill the spaces between the larger aggregate particles. The catalyst particles act as carbon coated fillers which contribute to the strength of the asphalt composite. There is no suggestion of utilizing catalyst particles which are not coated with carbon, as this would defeat the purpose of the invention. As would be expected, there is no mention in the patent of any effect which the addition of the catalyst has on hardening of the asphalt.

Other features and aspects of the invention, as well as other benefits thereof, will readily be ascertained from the more detailed description of the invention which follows.

BRIEF DESCRIPTION OF THE DRAWING

The single FIGURE of the drawing is a graph showing the penetration of standard asphalt of the present invention plotted against time.

DETAILED DESCRIPTION OF THE PREFERRED EMBODIMENT

As stated above, the hardening of asphalt in road pavings is due in large part to oxidative condensation of the asphalt. It has been found that by distributing particle fines of catalytic cracking catalyst throughout the asphalt oxidative condensation is prevented. It is believed that the particles adsorb the reactive species of the asphalt, thus preventing them from reacting with oxygen, and also absorb oxygen to again prevent a reaction between the asphalt and oxygen. Whatever the mechanism, the utilization of small amounts of catalytic cracking catalyst particles as an additive in asphalt prevents or at the least greatly delays hardening of the asphalt.

The catalyst particles are extremely small in size, in the nature of fines or powder, and are 1 to 200 microns in size. They are comprised of crystalline and amorphous silica as well as silica-alumina combinations. Unlike spent or equilibrium catalyst particles which would contain an adsorbed coating of coke, the additive utilized in this invention is free of adsorbed hydrocarbons and is still an active catalyst. The additive particles preferably are obtained by the caustic scrubbing of stack gases resulting from the burning of equilibrium catalyst particles as part of a coke removal process. The use of such particles as an additive in accordance with the invention thus solves the problem of disposal of the particles, which up to now had to be disposed of primarily in land fills.

The invention can be carried out in connection with any type of road grade asphalt which has the problem of hardening with age. Within the group of asphalts with which the invention would be practiced many asphalts will have different characteristics, and so the amount of additive which would be added will necessarily vary from case to case. In general, however, the additive may be present in amounts as low as 0.1%, by weight of the asphalt, to about 5.0%, by weight of the asphalt. The minimum amount of additive that could be used would be the amount sufficient to provide the anti-hardening effect desired for the particular asphalt in question. The small particle size of the catalyst maximizes the surface area of the catalyst presented to the asphalt and is responsible in some degree for the small amounts of catalyst which can be used. It is desirable not to utilize more than the maximum amount of catalyst indicated above because greater quantities present difficulties in maintaining the catalyst suspended in the asphalt.

The amount of asphalt normally employed in the road paving mix need not change as a result of the addition of the catalyst additive. The mix accordingly would comprise about 3% to 8% asphalt, by weight of the total mix, and the amount of the usual aggregate and fillers would comprise about 92% to 97% by weight of the total mix. Thus the amount of additive in the mix is quite small.

Preferably, the catalyst additive is added directly to the asphalt and thoroughly mixed so that it is uniformly distributed throughout the asphalt. The catalyst particles thus become a component part of the asphalt adhesion layer and can function to prevent oxidation of the asphalt. Although it is possible to add the catalyst to the aggregate so that it becomes mixed with the asphalt during the step of mixing the asphalt with the aggregate, this is not the preferred procedure because there is some risk that the catalyst will not be as thoroughly mixed with the asphalt as it is when added directly to the asphalt. By ensuring that the catalyst is thoroughly mixed and uniformly distributed throughout the asphalt, it prevents pockets of asphalt from being deprived of catalyst, which would allow portions of the asphalt to harden faster than other portions.

EXAMPLES

To illustrate the properties of treated asphalt and the benefits obtained from the invention, the catalyst additive, obtained in the manner described above, was added to three different types of road asphalts in different amounts and thoroughly mixed with each by means of an impeller in a cylindrical tank. The catalyst was dried at temperatures in the range of 212° F. to 1000° F. and was mixed into the asphalt at temperatures in the range of 300° F. to 400° F. Standard grade road asphalts AC-20, AC-30 and AC-40 were used. A portion of each of the resulting mixtures was subjected to the standard accelerated hardening Thin Film Oven Test (ASTM D1754-83) to provide aged asphalt, and the remaining portions were left untreated so as to be unaged. The absolute viscosity (ASTM D2171-78), the kinematic viscosity (ASTM D445-86), the penetration (ASTM D5-73) and the TCE solubility (ASTM D2042-76) of the unaged asphalts were then determined, as were the absolute viscosity and the weight loss (ASTM D1754-83) of the aged asphalts. The results of the tests for the AC-20 asphalt are shown in the following Table 1.

TABLE 1

| AC-20 Asphalt Properties vs. Additive Concentration | | | | |
|---|---|---|---|---|
| Additive (wt % of asphalt) | 0 | 0.08 | 0.15 | 0.30 |
| Unaged Asphalt | | | | |
| Abs. Viscosity (poise @ 140° F.) | 2110 | 2134 | 2024 | 2214 |
| Kin. Viscosity (cst @ 275° F.) | 478 | 509 | 509 | 466 |
| Penetration (mm @ 77° F.) | 44 | 44 | 45 | 45 |
| TCE Solubility (wt %) | 100.0 | 100.0 | 99.9 | 100.0 |
| Aged Asphalt | | | | |
| TFOT Loss (wt %) | 0.20 | 0.19 | 0.18 | 0.22 |
| Abs. Viscosity (poise @ 140° F.) | 5487 | 5384 | 5514 | 3251 |
| Viscosity Aging Ratio | 2.60 | 2.52 | 2.72 | 1.47 |

It will be seen from Table 1 that the presence of the catalyst had little if any effect on any of the tests performed on the unaged asphalt. The major effect on the aged asphalt, however, is quite evident. The absolute viscosity of the aged asphalt at 0.30 wt % of catalyst content is substantially lower than the absolute viscosity of the aged asphalt with lesser amounts of catalyst. The ratio of the aged viscosity to the unaged viscosity is a good indicator of this phenomenon, dropping greatly from a generally constant figure in the range of 2.52 to 2.72 to a low figure of 1.47. Less hardening obviously occurred with the higher amount of catalyst in the asphalt.

Table 2, which contains data obtained in connection with the AC-30 asphalt, is set forth below.

TABLE 2

| AC-30 Asphalt Properties vs. Additive Concentration | | | |
|---|---|---|---|
| Additive (wt % of asphalt) | 0 | 1.0 | 2.0 |
| Unaged Asphalt | | | |
| Abs. Viscosity (poise @ 140° F.) | 2683 | 2482 | 2700 |
| Kin. Viscosity (cst @ 275° F.) | 454 | 443 | 499 |
| Penetration (mm @ 77° F.) | 56 | 64 | 63 |
| TCE Solubility (wt %) | 98.88 | 99.27 | 99.11 |
| Aged Asphalt | | | |
| TFOT Loss (wt %) | 0.35 | 0.14 | 0.50 |
| Abs. Viscosity (poise @ 140° F.) | 6824 | 7281 | 5626 |
| Viscosity Aging Ratio | 2.54 | 2.93 | 2.08 |

The ratio of the aged absolute viscosity to the unaged absolute viscosity is in the same general range as in Table 1 with respect to asphalt without catalyst and asphalt containing 1.0 wt % catalyst. When 2.0 wt % of catalyst was used, however, the ratio is substantially less, indicating that less hardening of the aged asphalt occurred at this level of catalyst content. The reason more catalyst was required to cause the hardening preventative effect in this AC-30 asphalt sample as opposed to the AC-20 asphalt tested in Table 1 is that the AC-30 asphalt contained a higher concentration of components which can be hardened via oxidative condensation.

Table 3, which contains data in connection with the AC-40 asphalt, is presented below.

TABLE 3

| AC-40 Asphalt Properties vs. Additive Concentration | | | |
|---|---|---|---|
| Additive (wt % of asphalt) | 0.3 | 1.0 | 2.0 |
| Unaged Asphalt | | | |
| Abs. Viscosity (poise @ 140° F.) | 4082 | 4068 | 3829 |
| Kin. Viscosity (cst @ 275° F.) | 573 | 644 | 635 |
| Penetration (mm @ 77° F.) | 50 | 46 | 51 |
| TCE Solubility (wt %) | 99.68 | 99.41 | 99.12 |
| Aged Asphalt | | | |
| TFOT Loss (wt %) | 0.38 | 0.30 | 0.31 |
| Abs. Viscosity (poise @ 140° F.) | 16697 | 16372 | 10149 |
| Viscosity Aging Ratio | 4.16 | 4.02 | 2.65 |

Like the AC-30 asphalt test results in Table 2, Table 3 shows that the AC-40 asphalt tested displayed a marked reduction in hardening when catalyst was added at a level of concentration of 2.0 wt % of the asphalt.

With respect to the data produced by the tests to determine kinetic viscosity, the TFOT loss and the TCE solubility, it can be seen that within statistical variance the presence of the catalyst in varying amounts had no effect on these properties of the asphalt.

To further verify the findings of the tests reported in Tables 1, 2 and 3, catalyst in the amount of 0.30 wt % was added to a standard road asphalt of 150 Pen. Air heated to 450° F. was then blown against both the standard asphalt and the asphalt containing catalyst over a period of 14 hours, during which time penetration measurements at 77° F. were periodically taken. The penetration of the asphalts was plotted against time, resulting in the two curves shown in the drawing.

It can be seen that the asphalt containing the catalyst had consistently higher penetration values than the standard asphalt without catalyst. Since asphalt hardening yields lower penetration values, the curves demonstrate that the presence of catalyst prevents hardening via oxidative condensation.

In addition to the tests run on asphalt, the initial strength, as determined by the Marshall stability test, and the percent retained strength after water saturation were determined for road paving mixes both with and without catalyst. To obtain one sample batch, a base course mixture was prepared using 3.8 wt % asphalt and 96.2 wt % aggregate. The aggregate of the base course design comprised 90% unwashed Kentucky limestone and 10% Kentucky river gravel. The Kentucky limestone was comprised of 5 parts of ¾" nominal maximum size and 4 parts of ⅜" and less size. The gravel was also comprised of ⅜" and less size. To obtain the other sample batch, a surface course mixture was prepared using 5.0 wt % asphalt and 95 wt % aggregate. The aggregate in the surface course design comprised 60% unwashed Kentucky limestone and 40% Kentucky river gravel. The Kentucky limestone was comprised of 4 parts of ¾" nominal maximum size and 2 parts of ⅜" and less size. In each case AC-20 asphalt of the type tested in compiling the data for Table 1 was mixed with the aggregate to form the road mix.

The initial strength of the mix was determined by the Marshall Stability test (ASTM D1559). The percent retained strength of the mix after water saturation was determined by the ASTM D1075 test procedure. The results of these tests are shown in Table 4, below.

TABLE 4

| Road Mix Strength Vs. Additive Concentration | | |
|---|---|---|
| Base Course | | |
| Additive (wt % of asphalt) | 0 | 0.15 |
| AC-20 Asphalt (wt % of mix) | 3.8 | 3.8 |
| Marshall Stability (lbs) | 2115 ± 280 | 2260 ± 240 |
| Retained Strength (%) | 93.8 ± 9.8 | 88.6 ± 9.8 |
| Surface Course | | |
| Additive (wt % of asphalt) | 0 | 0.15 |
| AC-20 Asphalt (wt % of mix) | 5.0 | 5.0 |
| Marshall Stability (lbs) | 1670 ± 180 | 1720 ± 80 |
| Retained Strength (%) | 70.5 ± 7.3 | 68.9 ± 4.1 |

As shown in Table 4, the catalyst has no effect within statistical variance on the initial strength (Marshall stability) of either the base course or the surface course mixtures. Similarly, within statistical variance the catalyst has no effect on the percent retained strength, thus having no adverse effect on water stripping of the asphalt from the aggregate. Thus road mixes can be designed to the same parameters normally employed, regardless of whether catalyst is used as an additive in the asphalt.

It should now be clear that the present invention permits the use of a waste material as an additive in asphalt to significantly reduce the hardening of asphalt as it ages. It should be understood that the invention is not necessarily limited to all the specific details described in connection with the preferred embodiment but that changes which do not affect the overall basic function and concept of the invention may be made by those skilled in the art without departing from the spirit and scope of the invention, as defined in the appended claims.

What is claimed is:

1. An asphalt composition for use as a road asphalt, comprising in combination with asphalt, particles of petroleum catalytic cracking catalyst present substantially uniformly throughout the asphalt in amounts, by weight of the asphalt, in the range of 0.1% to 5.0%.

2. An asphalt composition according to claim 1, wherein the particles of cracking catalyst are present in amounts, by weight of the asphalt, of 0.2% to 2.0%.

3. An asphalt composition according to claim 1, wherein the cracking catalyst particles are of a size in the range of 1 to 200 microns and are comprised of crystalline and amorphous silica and alumina and silica-alumina combinations.

4. An asphalt composition according to claim 3, wherein the cracking catalyst comprises catalytic cracking catalyst particles which have been used in a fluid catalytic cracking process and which have been burned to remove hydrocarbons deposited thereon during the catalytic cracking process.

5. An asphalt-based road paving mixture, comprising a substantially uniform mixture of asphalt, aggregate, filler and particles of petroleum cracking catalyst, the particles of catalyst being present in amounts, by weight of the asphalt, of 0.1% to 5.0%.

6. An asphalt-based road paving mixture according to claim 5, the asphalt being present in amounts of about 3% to 8% by weight of the total amount of asphalt, aggregate and filler, and the combined aggregate and filler being present in amounts of about 92% to 97% by weight of the total amount or asphalt, aggregate and filler.

7. An asphalt-based road paving mixture according to claim 5, wherein the cracking catalyst comprises catalytic cracking catalyst particles which have been used in a fluid catalytic cracking process and which have been burned to remove hydrocarbons deposited thereon during the catalytic cracking process.

8. A method of producing an asphalt-based road paving mixture including asphalt and aggregate, comprising the steps of:
   burning off hydrocarbons from catalytic cracking catalyst particles which have been used in a fluid catalytic cracking process; and
   including the catalyst particles in the asphalt-based road paving mixture, the particles being present substantially uniformly throughout the mixture in amounts, by weight of the asphalt, of 0.1% to 5.0%.

9. A method according to claim 8, wherein the catalytic cracking catalyst particles are added to the asphalt and mixed therewith, the resulting mixture being mixed with aggregate to form the paving mixture.

10. A method according to claim 8, wherein the catalytic cracking catalyst particles and the aggregate are added to the asphalt and mixed therewith so that the catalyst particles and the aggregate are present substantially uniformly throughout the mixture.

11. A method according to claim 8, wherein the catalytic cracking catalyst particles are present in the amount of 0.2% to 2.0% by weight of the asphalt.

12. A method according to claim 8, wherein the catalytic cracking catalyst particles are comprised of crystalline and amorphous silica and alumina and silicaalumina combinations, and are of a size in the range of 1 to 200 microns.

13. An asphalt composition according to claim 4, wherein said particles of petroleum catalytic cracking catalyst are obtained by caustic scrubbing of stack gases resulting from burning equilibrium catalyst particles as part of a coke removal process.

14. An asphalt composition according to claim 1, wherein said particles of petroleum catalytic cracking catalyst are substantially free of hydrocarbons.

15. An asphalt-based road paving mixture according to claim 7, wherein said particles of petroleum catalytic cracking catalyst are obtained by caustic scrubbing of stack gases resulting from burning equilibrium catalyst particles as part of a coke removal process.

16. An asphalt-based road paving mixture according to claim 5, wherein said particles of petroleum catalytic cracking catalyst are substantially free of hydrocarbons.

17. A method according to claim 8, wherein the asphalt is present in the mixture in amounts of about 3% to 8% by weight of the total amount of asphalt, aggregate and filler, and the combined aggregate and filler being present in amounts of about 92% to 97% by weight of the total amount of asphalt, aggregate and filler.

18. A method according to claim 8, wherein said particles of petroleum catalytic cracking catalyst are obtained by caustic scrubbing of stack gases resulting from burning equilibrium catalyst particles as part of a coke removal process.

19. A method according to claim 8, wherein said particles of petroleum catalytic cracking catalyst are substantially free of hydrocarbons.

20. An asphalt-based road paving mixture according to claim 5 wherein the cracking catalyst particles are of a size in the range of 1 to 200 microns.

* * * * *

UNITED STATES PATENT AND TRADEMARK OFFICE
CERTIFICATE OF CORRECTION

PATENT NO. : 4,908,064

DATED : March 13, 1990

INVENTOR(S) : Mark A. Plummer

It is certified that error appears in the above-identified patent and that said Letters Patent is hereby corrected as shown below:

Col. 1, line 46:  Delete "silicaalumina" and insert --silica-alumina--.
Col. 2, line 16:  After "standard asphalt" insert --and asphalt--.
Col. 6, line 52:  After "amount" delete "or" and insert --of--.
Col. 7, line 18:  Delete "silicaalumina" and insert --silica-alumina--.

Signed and Sealed this

Fourth Day of June, 1991

Attest:

HARRY F. MANBECK, JR.

*Attesting Officer*  *Commissioner of Patents and Trademarks*